(12) United States Patent
Nielsen et al.

(10) Patent No.: US 6,559,988 B1
(45) Date of Patent: May 6, 2003

(54) OPTICAL WAVELENGTH ADD/DROP MULTIPLEXER FOR DUAL SIGNAL TRANSMISSION RATES

(75) Inventors: Torben N Nielsen, Monmouth Beach, NJ (US); Magaly Spector, Holmdel, NJ (US); William A. Thompson, Red Bank, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/464,832

(22) Filed: Dec. 16, 1999

(51) Int. Cl.$^7$ ................................................. H04J 14/02
(52) U.S. Cl. ........................ 359/127; 359/130; 385/24; 385/37
(58) Field of Search ................................ 359/127, 130, 359/124; 385/24, 37

(56) References Cited

U.S. PATENT DOCUMENTS

| 5,748,349 A | * | 5/1998 | Mizrahi | 359/130 |
| 5,748,350 A | * | 5/1998 | Pan et al. | 359/130 |
| 5,982,518 A | * | 11/1999 | Mizrahi | 359/130 |
| 6,201,907 B1 | * | 3/2001 | Farries | 385/24 |
| 6,185,023 B1 | * | 2/2002 | Mizrahi | 359/130 |

OTHER PUBLICATIONS

C. Randy Giles et al., "*The Wavelength Add/Drop Multiplexer for Lightwave Communications Networks*", Bell Labs Technical Journal, Jan.–Mar. 1999, pp. 207–209.

* cited by examiner

*Primary Examiner*—Kinfe-Michael Negash

(57) ABSTRACT

An optical wavelength add/drop multiplexer (WADM) is configured to add or drop two or more signals each associated with one of a plurality of channels in a wavelength division multiplexed (WDM) signal. The WADM comprises an optical circulator that is optically coupled at one port to two or more serially interconnected fiber Bragg gratings (FBGs), and is optically coupled at another port to a thin film filter including two or more serially interconnected thin film filter elements. Each of the two or more FBGs is matched with a thin film filter element, both arranged to be responsive to signals associated with one of the plurality of channels. Bandwidth and dispersion properties for the FBGs are selected to permit operation of the WADM at two distinct signal data rates. To equalize associated insertion losses in embodiments of the invention arranged to add or drop two or more signals, the FBGs are matched to the thin film filter elements in inverse order with respect to their optical distance from the optical circulator.

38 Claims, 10 Drawing Sheets

400

800

OPTICAL WAVELENGTH ADD/DROP MULTIPLEXER FOR DUAL SIGNAL TRANSMISSION RATES

FIELD OF THE INVENTION

This invention relates to optical wavelength add/drop multiplexers. More specifically, it relates to an optical wavelength add/drop multiplexer operable to add or drop digital optical signals from optical channels that may each be operating at one of two or more data transmission rates.

BACKGROUND OF THE INVENTION

Broadband telecommunications networks are being configured to carry increasing volumes of voice, data and multimedia information. To meet these increasing volume demands, such networks are being implemented using optical communications systems technology. For example, optical wavelength-division multiplexed (WDM) technology may be used to support dozens of communications channels transported at different wavelengths on a single optical fiber.

In WDM optical networks, wavelength add/drop multiplexers (WADMs) have been used to selectively remove and reinsert WDM channels at intermediate points across these networks (see, e.g., C. Randy Giles et al., "The Wavelength Add/Drop Multiplexer for Lightwave Communications Networks," Bell Labs Technical Journal, January–March 1999, pp. 207–229). For example, WADMs have been constructed using optical multiplexer/demultiplexer pairs that first demultiplex a multi-channel WDM optical signal into individual WDM channels on individual optical paths, and then re-multiplex signals on the individual optical paths back into a single multi-channel WDM optical signal. Single channel WDM signals may be dropped from or added to a selected number of the individual optical paths before the signals are re-multiplexed.

Alternatively, in order to avoid demultiplexing and re-multiplexing each of the channels in the WDM signal, a variety of optical filter technologies have been employed in WADM systems to drop signals from or add signals to selected channels in the multi-channel WDM optical signal. Such filter technologies include, for example, fiber Bragg gratings (FBGs), thin film filters and arrayed waveguide gratings. Use of such filter technologies in WADMs is preferred when only a few of many channels in a WDM signal are either being dropped or added.

Optical filter characteristics are largely dictated by associated WDM signal characteristics. For example, synchronous optical network (SONET) OC192 channels operating at 10 gigabits per second require filters with an effective bandwidth of at least 48 gigahertz, while SONET OC48 channels operating at 2.5 gigabits per second require filters with an effective bandwidth of at least 10 gigahertz. In addition, OC192 channels require filters that are selective among channels spaced at 100 gigahertz intervals, while OC48 channels require filters that are selective among channels spaced at 50 gigahertz intervals. As a result, WADM filters usable at one WDM data transmission rate are generally unusable at alternate data rates.

For increased flexibility, some current WDM systems allow individual channels to be operated at alternate data rates. For example, an OC192 channel with 100 gigahertz spacing may alternatively be replaced by two OC48 channels with 50 gigahertz spacing. This increased flexibility helps to maximize utilization of capacity in WDM systems.

To date, such flexible systems have used dedicated WADM filters to filter signals at each data rate. This approach adds cost and reduces inherent flexibility in the selection of channels for a given WADM signal. Accordingly, there is a need to provide a more flexible and cost-effective means for filtering optical channels in a WDM signal with varying data rates.

SUMMARY OF THE INVENTION

Flexibility is increased and cost is reduced in an optical wavelength add/drop multiplexer (WADM) configured to add or drop two or more WDM channels that may each be operating at one of either a first data rate or a second data rate. The WADM comprises an optical circulator that is coupled at one port to two or more serially interconnected FBGs, and at another port to a thin film filter including two or more serially interconnected thin film filter elements (TFFEs). Each of the FBGs and TFFEs has an effective bandwidth to filter signals from one of the two or more WDM channels. Bandwidth and dispersion characteristics for the FBGs are selected to minimize anticipated filter performance penalties for operation at both the first and second data rates.

FBGs and TFFEs contribute insertion loss to the filtered signals. According to the principles of the present invention, FBGs and TFFEs are configured to approximately equalize the amount of insertion loss associated with each added or dropped channel. Specifically, FBGs and TFFEs are configured such that optical channels are assigned to FBGs in order of the FBGs' increasing optical distance from the circulator, and assigned to TFFEs in order of the TFFEs' decreasing optical distance from the circulator.

In a preferred embodiment of the invention supporting a first data rate of no more than 2.5 gigabits per second and a second data rate of 10 gigabits per second, the WADM includes four FBGs and four thin film filters. In order to employ conventional thin film filter elements having an effective bandwidth of 200 gigahertz, each pair of adjacent FBGs and each pair of adjacent thin film filters are selected to have characteristic wavelengths spaced at 200 gigahertz intervals. Bandwidth and dispersion characteristics of the FBGs are selected to enable operation at both the first and second data rates. Specifically, each FBG is selected to have an effective bandwidth (i.e., reflected by a power difference over the bandwidth of no more than 10 dB) of about 0.45 nanometers. Each FBG is further selected with dispersion values that deviate by no more than approximately 150 picoseconds per nanometer from a predetermined reference value at wavelengths no more than 0.1 nanometers above and below a characteristic wavelength, and with deviation increasing above 150 picoseconds per nanometer at a rate no greater than approximately 20,000 picoseconds per square nanometer at wavelengths beyond 0.1 nanometers from the characteristic wavelength.

BRIEF DESCRIPTION OF THE DRAWING

The invention will be more fully understood from the following detailed description taken in connection with the accompanying drawing, in which.

Figure 1:
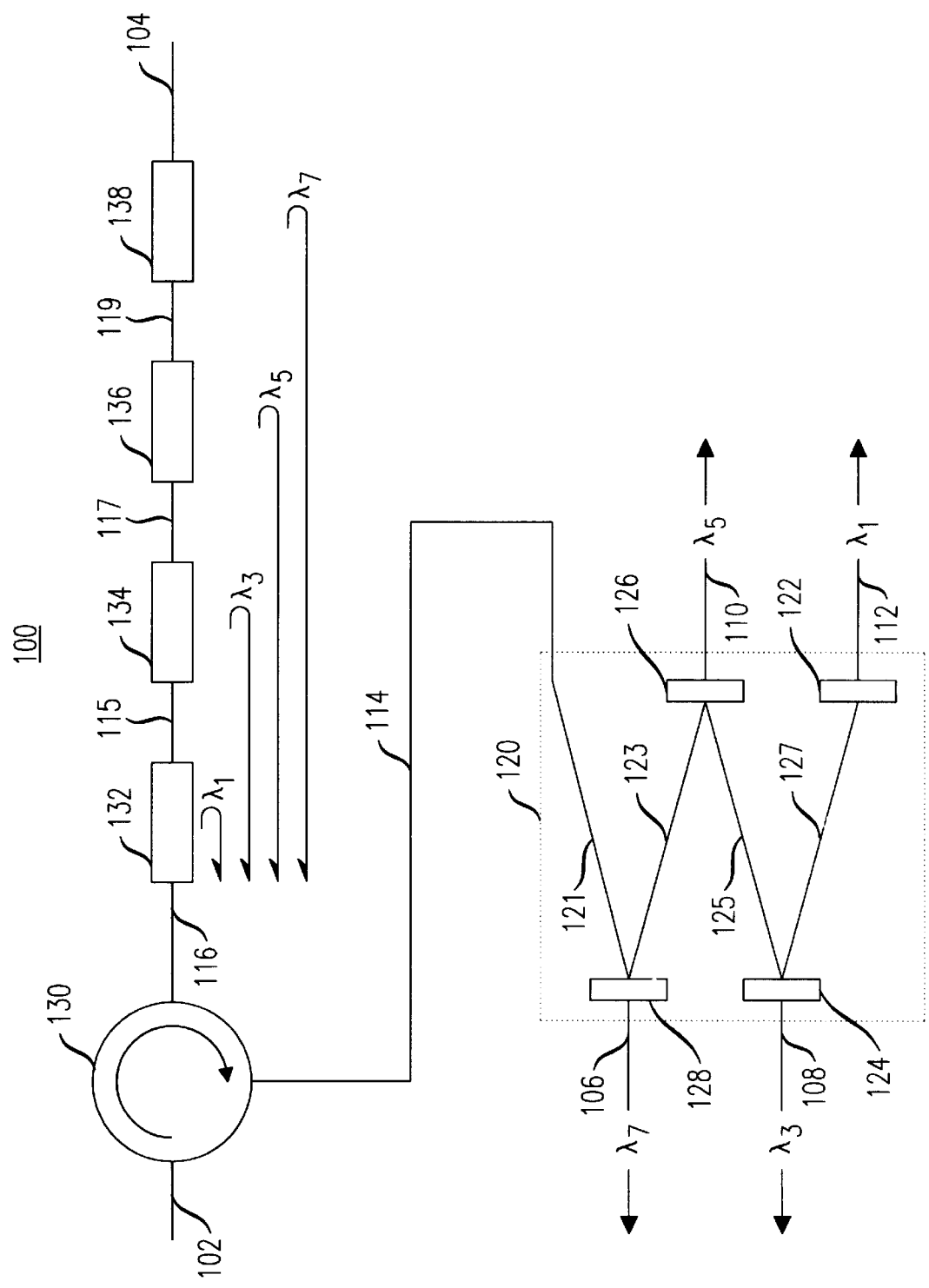
FIG. 1 depicts a first embodiment of the present invention for dropping optical channels from a WDM signal.
Figure 2:
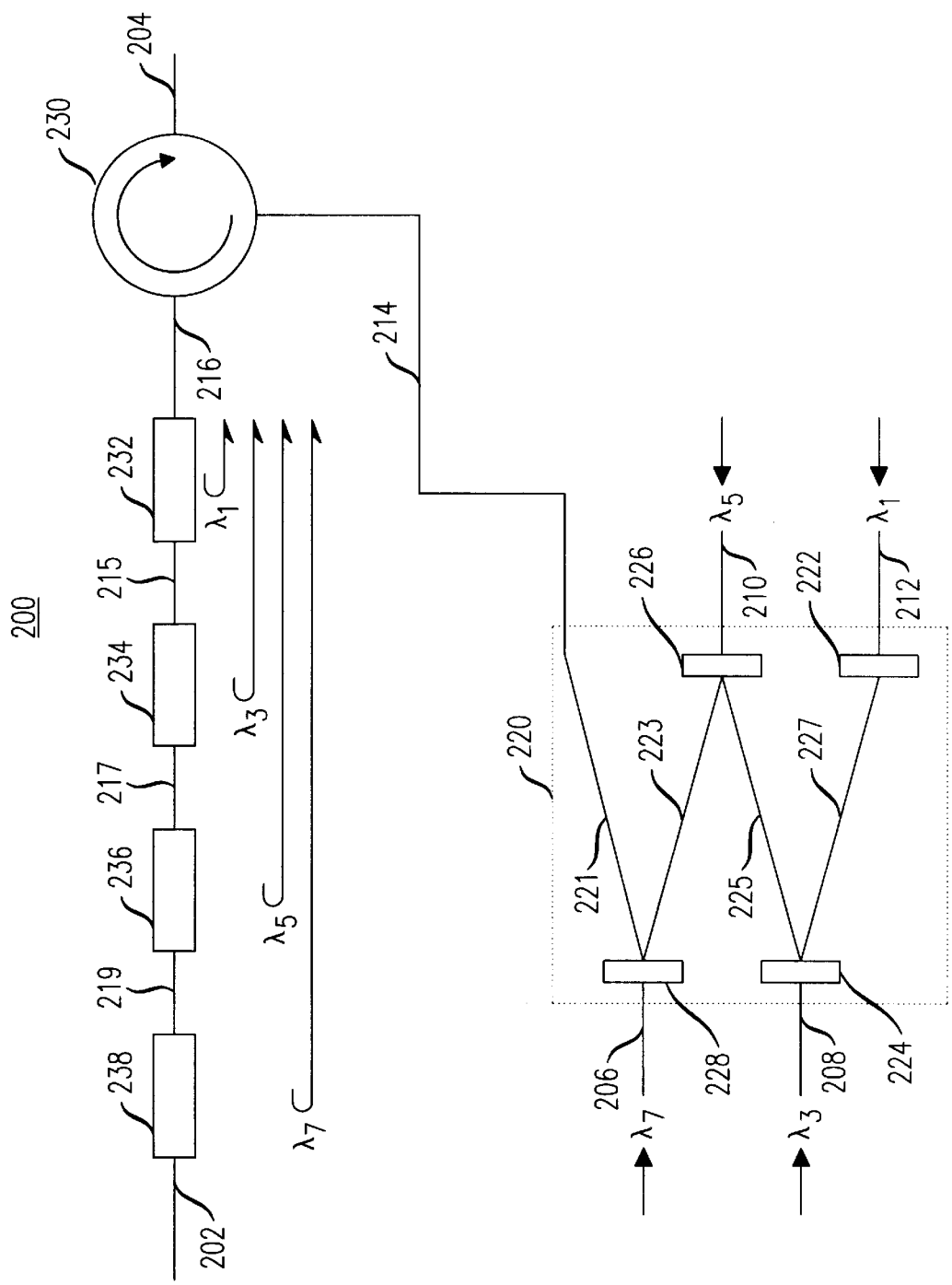
FIG. 2 depicts a second embodiment of the present invention for adding optical channels to a WDM signal.

For consistency and ease of understanding, those elements of each figure that are similar or equivalent share identification numbers that are identical in the two least significant digit positions (for example, FBG 132 of FIG. 1 is equivalent to FBG 232 of FIG. 2).

DETAILED DESCRIPTION

Consistent with the principles of the present invention, FIG. 1 depicts a wavelength add/drop multiplexer (WADM) 100 configured to drop optical signals associated with a maximum of four channels in a multi-channel WDM signal. The WDM signal enters an optical circulator 130 in WADM 100 via input 102. Optical circulator 130 functions to transport optical signals received at input 102 to link 116 and to transport optical signals received via link 116 to link 114. Optical circulator 130 is an asymmetrical circulator, as it does not further function to transport optical signals received via link 114 to input 102. Such asymmetrical circulators are well-known in the art and are commercially available, for example, from JDS Uniphase and others.

Circulator 130 of FIG. 1 transports the WDM signal from input 102 via link 116 to fiber Bragg gratings (FBGs) 132, 134, 136 and 138. FBGs 132, 134, 136 and 138 are responsive to optical signals carried by channels approximately centered at wavelengths $\lambda_1$, $\lambda_3$, $\lambda_5$, and $\lambda_7$, respectively.

FBGs 132, 134, 136 and 138 are of a type that may be obtained commercially, for example, from JDS Uniphase, Corning, and Sumitomo Electric Lightwave Corp. In order to be suitable for application in the present invention, FBGs 132, 134, 136 and 138 are selected to exhibit the bandwidth and dispersion characteristics described further herein.

Upon receiving a WDM signal over link 116, FBG 132 operates to substantially reflect a component of the multi-wavelength WDM signal carried by a channel approximately centered at wavelength $\lambda_1$, and to substantially pass other WDM signal components over link 115 to FBG 134. Similarly, FBG 134 operates to substantially reflect a component of the multi-wavelength WDM signal carried by a channel approximately centered at wavelength $\lambda_3$ and to pass other signal components over link 117 to FBG 136. FBG 136 substantially reflects a component of the WDM signal carried by a channel approximately centered at wavelength $\lambda_5$ while passing other components over link 119 to FBG 138, and FBG 138 substantially reflects a component of the WDM signal carried by a channel approximately centered at wavelength $\lambda_7$ while passing other components to output 104.

As a result of the operation of FBGs 132, 134, 136 and 138, signal components of the input WDM signal carried by channels approximately centered at wavelengths $\lambda_1$, $\lambda_3$, $\lambda_5$, and $\lambda_7$ are substantially removed from the WDM signal reaching link 104. These removed component signals are reflected by FBGs 132, 134, 136 and 138 back to circulator 130, which directs the reflect signals over link 114 to thin film filter 120. Other WDM signal components not substantially reflected by FBGs 132, 134, 136 and 138 are transmitted through the WADM 100 over output 104.

Thin film filter 120 includes thin film filter elements (TFFEs) 122, 124, 126, and 128. TFFEs may be obtained commercially, for example, from JDS Uniphase, Corning, and DiCon Fiberoptics, Inc. One skilled in the art will readily recognize that other optical signal demultiplexing devices (for, example, such as a star coupler) may alternatively be employed in place of thin film filter 120 without deviating from the principles of the present invention. Low cost and insertion loss characteristics associated with thin film filter 120 suggest that it is particularly well-suited to be selected as the demultiplexing device.

TFFEs 122, 124, 126 and 128 are responsive to optical signals carried by channels approximately centered at wavelengths $\lambda_1$, $\lambda_3$, $\lambda_5$, and $\lambda_7$, respectively. For example, TFFE 128 receives the removed component signals in channels approximately centered at wavelengths $\lambda_1$, $\lambda_3$, $\lambda_5$, and $\lambda_7$ over link 121, and operates to substantially transmit the component associated with $\lambda_7$ over output 106 and to substantially reflect other remaining signal components over link 123 to TFFE 126. Similarly, TFFE 126 operates to substantially transmit the component associated with wavelength $\lambda_5$ over output 110 and to substantially reflect other remaining components over link 125 to TFFE 124. TFFE 124 substantially transmits the signal component associated with wavelength $\lambda_3$ over output 108, and reflects the final remaining component associated with wavelength $\lambda_1$ over link 127 to TFFE 122. TFFE 122 substantially transmits this final component associated with wavelength $\lambda_1$ over output 112. Accordingly, WDM signal components in channels associated with wavelengths $\lambda_1$, $\lambda_3$, $\lambda_5$, and $\lambda_7$ are dropped from the WDM input signal at outputs 112, 108, 110 and 106, respectively.

In addition to reflecting signals in channels associated with wavelengths $\lambda_1$, $\lambda_3$, $\lambda_5$, and $\lambda_7$, FBGs 132, 134, 136 and 138 may each also reflect signal components associated with adjacent channels. For example, signal drift and jitter may cause signal components at wavelengths normally at the edge of adjacent channels to overlap signals at the edges of the reflected channel. These overlapping signal components introduce adjacent channel crosstalk, which degrades the reflected signal.

Figure 6:
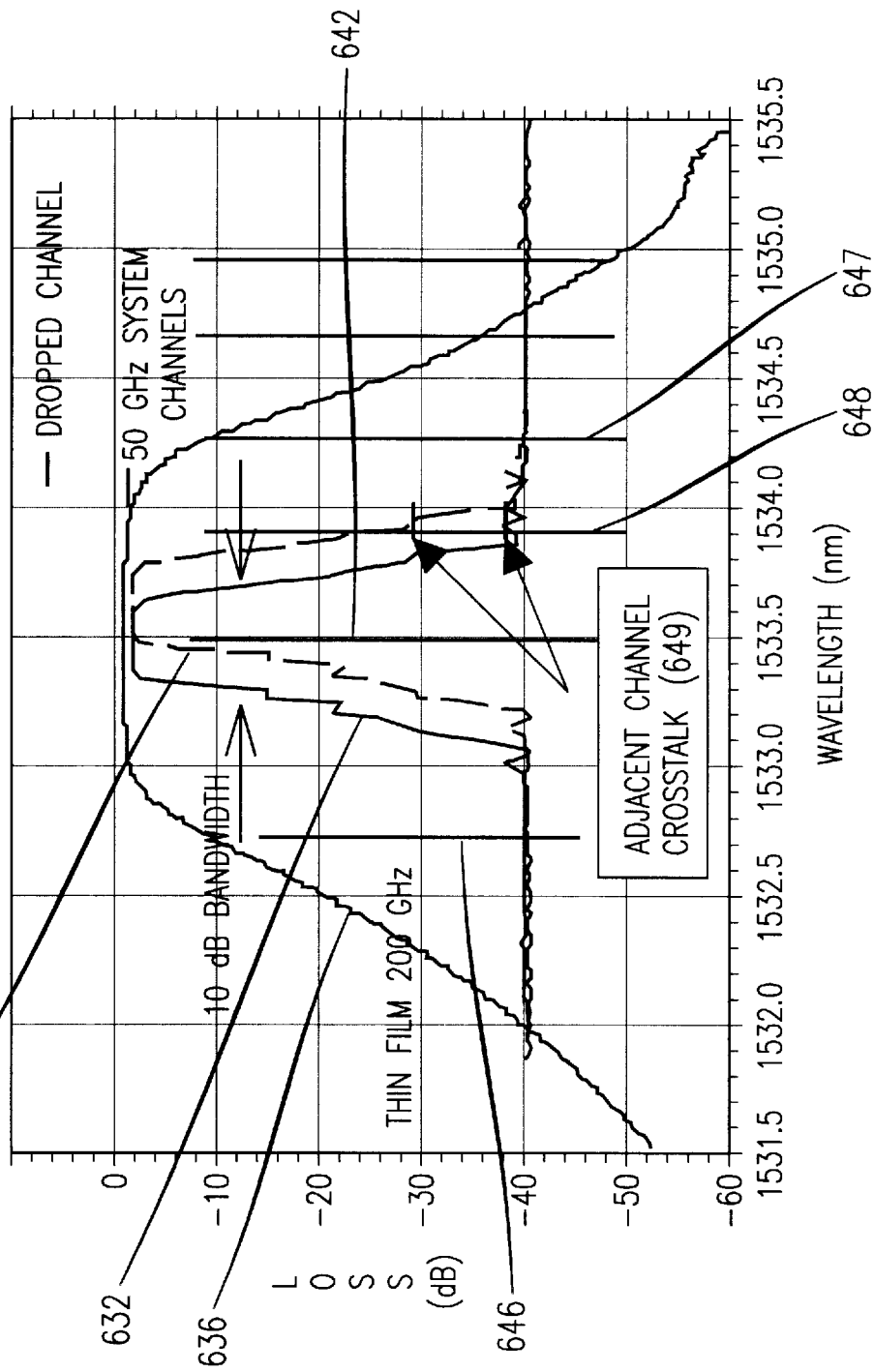
FIG. 6 shows a comparison of reflection spectrums for an FBG and a thin film filter used in the embodiments of FIGS. 1–4.

In the embodiment of FIG. 1, adjacent channel crosstalk is reduced as a result of next-stage filtering performed by TFFEs 122, 124, 126 and 128. FIG. 6 shows a typical FBG reflection profile 632 and a typical TFFE transmission profile 636 consistent with the embodiment of FIG. 1. Profiles 632 and 636 are associated with a FBG and a TFFE, respectively, that are each intended to filter a signal at a characteristic wavelength 642 of 1533.6 nanometers. This example may be easily extended to other WDM signals at a variety of characteristic wavelengths.

Profile 634 illustrates a shift in FBG profile 634 as the result of signal drift or jitter that causes, for example, in an increase in adjacent channel crosstalk 649 of approximately 10 dB at channel edge 648 (50 gigahertz away from characteristic wavelength 642). Beyond channel edge 648, TFFE profile 636 exhibits an increasing transmission loss. For example, attenuation levels of −10 dB and greater are exhibited by TFFE profile 636 at and beyond wavelengths 647 and 646 which lie approximately 1.4 nanometers away from characteristic wavelength 642 (or approximately 100 gigahertz away from characteristic wavelength 642). Thus, at and beyond channel edge 648, adjacent channel crosstalk transmitted by a TFFE exhibiting profile 636 will be attenuated.

WDM signals dropped by, added by or passed through WADM 100 are also subject to insertion losses. For example, insertion losses of approximately 0.2 dB are incurred by WDM signals being reflected or transmitted by one of the FBGs 132, 134, 136 and 138. Insertion losses of approximately 1.5 dB are incurred by WDM signals being transmitted by one of the thin film filter elements 128, 126, 124 and 122. Insertion losses of approximately 0.7 dB are incurred by WDM signals being reflected by one of the thin film filter elements 128, 126, 124 and 122. In addition, signal losses of approximately 0.6 dB per port are incurred by circulator 130.

WADM 100 of FIG. 1 is arranged to minimize the insertion loss experienced by each of the dropped WDM signals by substantially equalizing the number of filter elements each dropped WDM signal interacts with. For a given characteristic wavelength $\lambda_1$, $\lambda_3$, $\lambda_5$, or $\lambda_7$, the position of a TFFE in the series of TFFEs 128, 126,124 and 122 and the position of an associated FBG in the series of FBGs 132, 134, 136 and 138 are inverted with respect to circulator 130. For example, signals associated with wavelength $\lambda_1$ are reflected by FBG 132 and transmitted by TFFE 122. As a result, the dropped signal associated with wavelength $\lambda_1$ interacts with five elements (FBG 132 and thin film elements 128, 126, 124 and 122 ) between circulator 130 and output 112. The number of interactions and approximate insertion losses for each of the WDM signals dropped by WADM 100 of FIG. 1 is shown in Table 1.

TABLE 1

| Characteristic Wavelength | FBGs reflecting or transmitting signal | TFFEs reflecting or transmitting signal | Total number of affecting elements | Approximate insertion loss |
| --- | --- | --- | --- | --- |
| $\lambda_1$ | (132) | (128, 126, 124, 122) | five | 5.6 dB |
| $\lambda_3$ | (132, 134, 132) | (128, 126, 124) | six | 5.3 dB |
| $\lambda_5$ | (132, 134, 136, 134, 132) | (128, 126) | seven | 5.0 dB |
| $\lambda_7$ | (132, 134, 136, 138, 136, 134, 132) | (128) | eight | 4.7 dB |

In the embodiment of FIG. 1, FBGs 132, 134, 136 and 138 and TFFEs 128, 126, 124 and 122 are selected to filter channels approximately centered at wavelengths $\lambda_1$, $\lambda_3$, $\lambda_5$, and $\lambda_7$. Wavelengths $\lambda_1$, $\lambda_3$, $\lambda_5$, and $\lambda_7$ are selected with between-wavelength spacing of 200 gigahertz. As illustrated in FIG. 6, this spacing is consistent with thin film filter transmission profile 636, which has an effective −10 dB bandwidth (bounded by wavelengths 646 and 647) of approximately 1.6 nanometers or 200 gigahertz. Filter spacing of 200 gigahertz also helps to minimize the effects of coherent crosstalk.

Coherent crosstalk may arise when two or more copies of a signal are combined in one signal. In WADM 100 of FIG. 1, for example, components of the signal centered at wavelength $\lambda_5$ may be reflected by FBGs 132 and 134 before the remaining signal is fully reflected by FBG 136. Since FBGs 132 and 134 precede FBG 136 in the signal path, any signal component reflected by FBG 132 will have a phase advanced from the signal component reflected by FBG 134, and any signal component reflected by FBG 134 will have a phase advanced from the signal component reflected by FBG 136. As all three components recombine before reaching filter 120, the recombined signal with its component signal phase differences exhibits coherent crosstalk.

Figure 5:
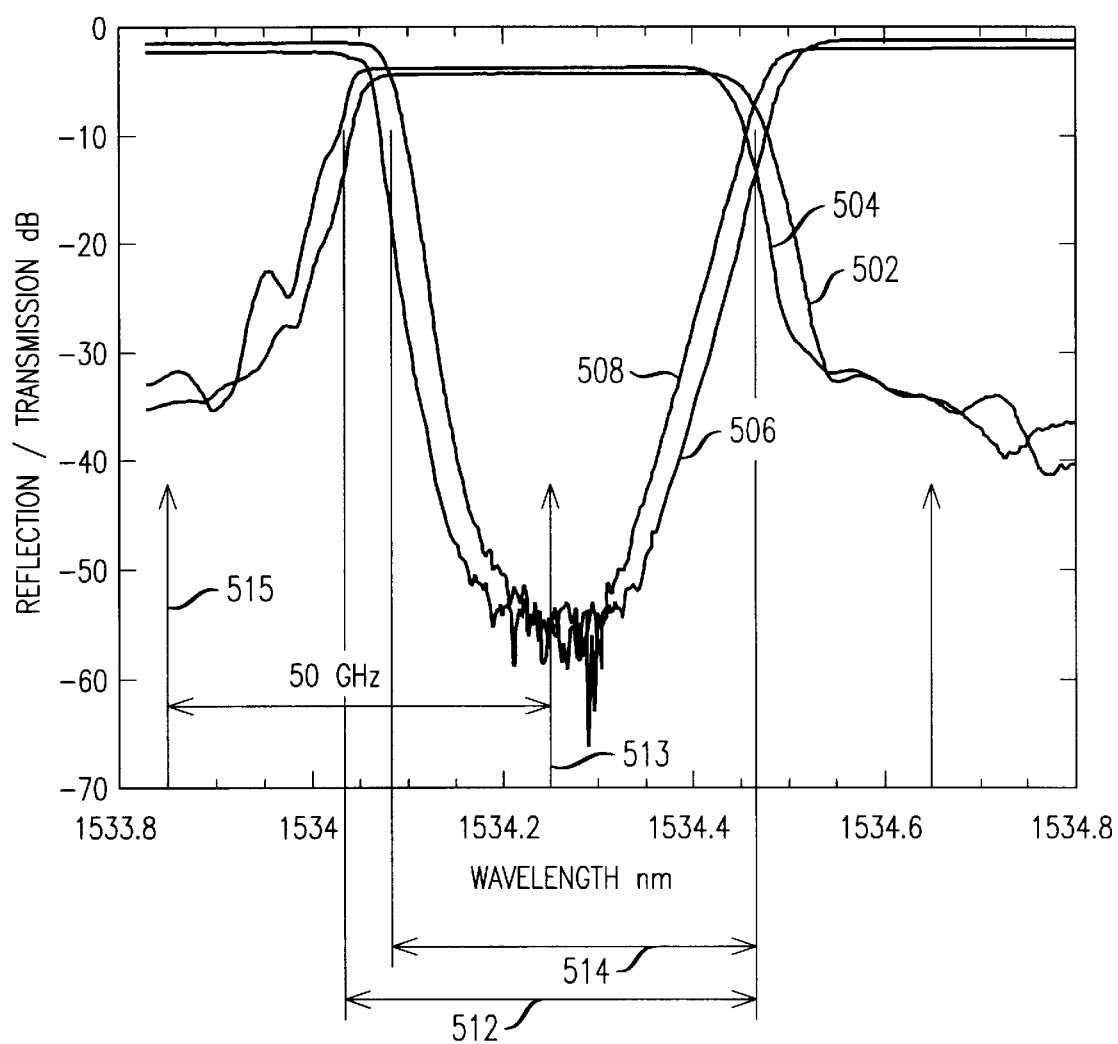
FIG. 5 illustrates a typical reflection and transmission spectrums for a fiber Bragg grating (FBG) used in the embodiments of FIGS. 1–4.

By spacing FBGs 132, 134, 136 and 138 such that adjacent FBGs have characteristic wavelengths that are 200 gigahertz apart, very little of the signal associated with one of the FBGs 132, 134, 136 and 138 is reflected by an adjacent FBG. As illustrated in FIG. 5, signals reflected by an FBG as near as 50 gigahertz to the characteristic wavelength (for example, the distance of wavelength 515 from characteristic wavelength 513) are reduced in power by nearly −40 dB.

Figure 8:
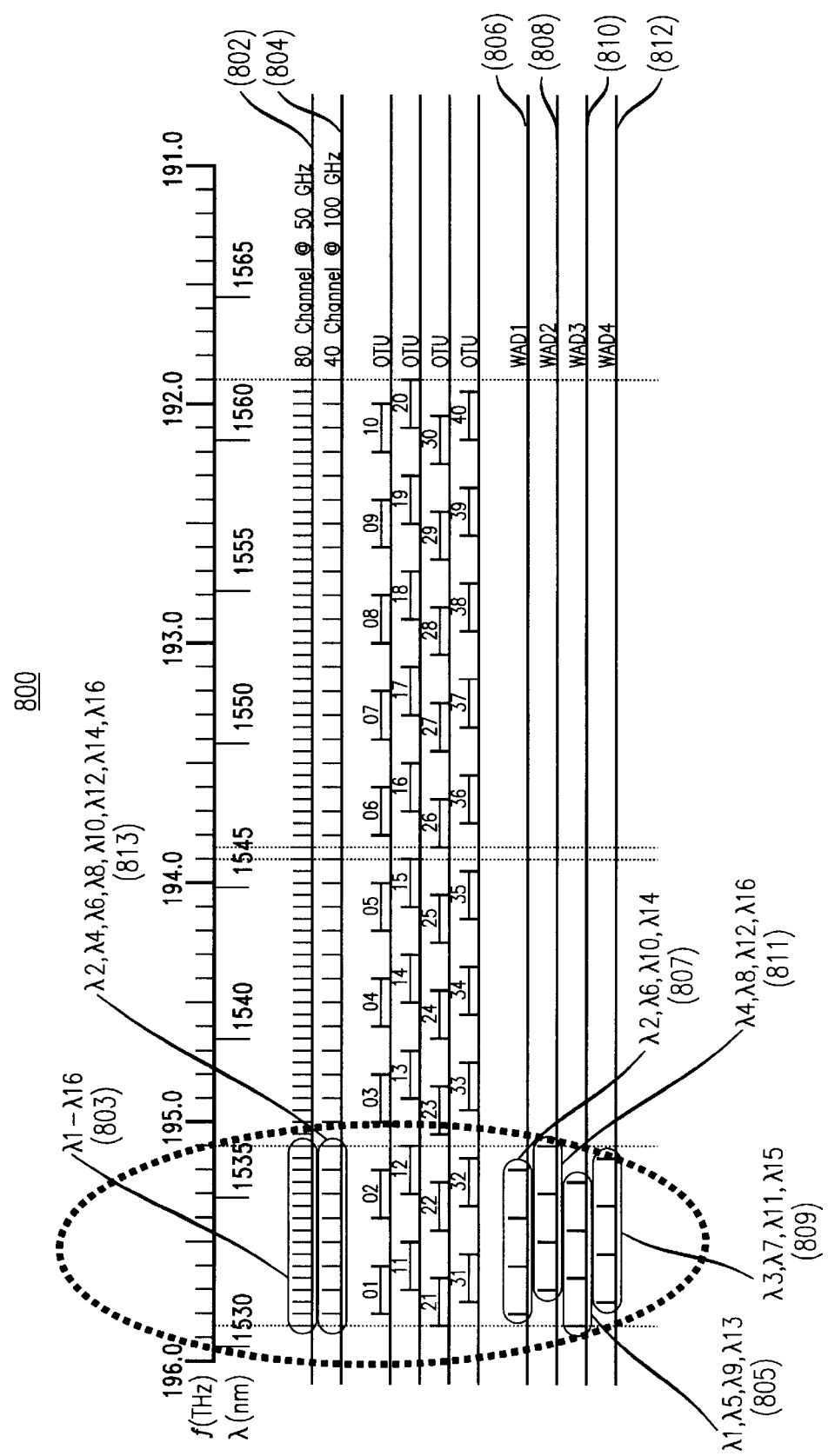
FIG. 8 illustrates how multiple WADMs may be used to add or drop a series of OC48 and OC192 channels.

Although FBGs 132, 134, 136 and 138 in WADM 100 of FIG. 1 have characteristic frequency spacing of 200 gigahertz, WDM signals with characteristic frequency spacing of 50 gigahertz or 100 gigahertz may be effectively filtered by combining a plurality of WADMs in sequence with filters at appropriately selected characteristic wavelengths. FIG. 8 illustrates the effect of such a combination.

In FIG. 8, WDM signal 802 has characteristic wavelength spacing of 50 gigahertz, and WDM signal 804 has characteristic wavelength spacing of 100 gigahertz. With 50 gigahertz spacing, for example, WDM signal 802 over spectrum 803 generates sixteen channels centered at wavelengths $\lambda_1$, through $\lambda_{16}$. Alternatively, with 100 gigahertz spacing, WDM signal 804 over spectrum 813 generates eight channels centered at wavelengths $\lambda_2$, $\lambda_4$, $\lambda_6$, $\lambda_8$, $\lambda_{10}$, $\lambda_{12}$, $\lambda_{14}$, and $\lambda_{16}$.

WADMs 806, 808, 810 and 812 are employed to filter signals from WDM channels associated with spectrums 803 and 813. Each of the WADMs 806, 808, 810 and 812 incorporate filters associated with WDM channels having 200 gigahertz characteristic wavelength spacing. For example, WADM 806 incorporates filters responsive to channel spectrum 807 associated with characteristic wavelengths $\lambda_2$, $\lambda_6$, $\lambda_{10}$ and $\lambda_{12}$. Collectively, WADMs 806, 808, 810 and 812 incorporate filters that are responsive to respective channel spectra 807, 811, 805 and 809 that together include channel spectrum 813 centered at wavelengths $\lambda_2$, $\lambda_4$, $\lambda_6$, $\lambda_8$, $\lambda_{10}$, $\lambda_{12}$, $\lambda_{14}$, and $\lambda_{16}$ and channel spectrum 803 centered at wavelengths $\lambda_1$ through $\lambda_{16}$.

As shown in FIG. 8, channel spectra 803 and 813 are selected to include low frequency channels in WDM signals 802 and 804. Because cladding-mode resonance produces FBG reflectances at wavelengths below the associated characteristic wavelength (see, e.g., Raman Kashyap, *Fiber Bragg Gratings*, Academic Press, 1999, pg. 159), selection of these lowest channels helps to reduce the accumulation of cladding-mode resonances.

In a second embodiment of the present invention related to the embodiment of FIG. 1, FIG. 2 depicts a WADM 200 configured to add optical signals associated with a maximum of four channels in a WDM signal. WDM signals associated with channels approximately centered at wavelengths $\lambda_1$, $\lambda_3$, $\lambda_5$, and $\lambda_7$ are added at inputs 212, 208, 210 and 206, respectively. TFFEs 222, 224, 226 and 228 are respectively coupled to inputs 212, 208, 210 and 206 to transmit respective signals associated with wavelengths $\lambda_1$, $\lambda_3$, $\lambda_5$, and $\lambda_7$. TFFEs 222, 224, 226 and 228 function to reflect WDM signals not associated with respective wavelengths $\lambda_1$, $\lambda_3$, $\lambda_5$, and $\lambda_7$.

Accordingly, a WDM signal associated with wavelength $\lambda_1$ may be transmitted by the TFFE 222 over link 227 and reflected by the TFFEs 224, 226 and 228 over respective links 225, 223 and 221 to reach optical circulator 230 via link 214. Similarly, a WDM signal associated with wavelength $\lambda_3$ may be transmitted by the TFFE 224 over link 225 and reflected by the TFFEs 226 and 228 over respective links 223 and 221 to reach circulator 230 via link 214. In addition, WDM signals associated with wavelengths $\lambda_5$ and $\lambda_7$ may be transmitted by TFFEs 210 and 206, respectively. In this case, the WDM signal transmitted by TFFE 210 will be further reflected by TFFE 206, and WDM signals associated with wavelengths $\lambda_5$ and $\lambda_7$ will both travel over links 221 and 214 to reach optical circulator 230.

Optical circulator 230 is an asymmetrical circulator of the same type noted for optical circulator 130 of FIG. 1. As an asymmetrical circulator, optical circulator 230 does not function to transport any optical signals received at output 204 to link 214.

Signals reflected by TFFEs 222, 224, 226 and 228 and forwarded to optical circulator 230 are next forwarded over link 216 to FBG 232. FBGs 232, 234, 236 and 238 are configured to reflect signals associated with channels approximately centered at wavelengths $\lambda_1$, $\lambda_3$, $\lambda_5$ and $\lambda_7$ respectively. Upon reaching circulator 230, the signal associated with wavelength $\lambda_1$ is transmitted to FBG 232 over link 216, where it is reflected back by FBG 232 over link 216 through circulator 230 to output 204. Similarly, the signal associated with wavelength $\lambda_3$ is transmitted over links 216 and 215 through FBG 232 to FBG 234, where it is reflected back by FBG 234 over links 215 and 216 through FBG 232 and circulator 230 to output 204. Signals associated with wavelengths $\lambda_5$, and $\lambda_7$ are reflected by FBGs 236 and 238, respectively. Signals associated with wavelength $\lambda_7$ are reflected by FBG 238 over link 219 through FBG 236. Signals associated with wavelengths $\lambda_5$, and $\lambda_7$ are further transmitted over link 217 through FBG 234, over link 215 through FBG 232, and over link 216 though circulator 230 to output 204.

A WDM signal may be input to the WADM 200 at input 202. As signals associated with wavelengths $\lambda_1$, $\lambda_3$, $\lambda_5$, and $\lambda_7$ are intended to be added to the WDM input signal, the WDM signal at input 202 will typically not contain any signal components in channels centered at these wavelengths. As a result, the WDM input signal will pass essentially unaltered over links 219, 217, 215 and 216 through FBGs 238, 236, 234 and 232 and through circulator 230 to output 204. However, if signals in channels associated with wavelengths $\lambda_1$, $\lambda_3$, $\lambda_5$, or $\lambda_7$ are present in the WDM signal at input 202, these signals will be essentially reflected back to input 202 by FBGs 232, 234, 236 or 238, respectively, and thereby removed from the WDM signal originating at input 202. Thus, in either case, signals in channels associated with wavelengths $\lambda_1$, $\lambda_3$, $\lambda_5$, and $\lambda_7$ may be effectively added to the WDM signal at output 204 via thin film filter 220.

Like WADM 100 of FIG. 1, WADM 200 of FIG. 2 is arranged to minimize maximum signal insertion loss for the added signals by equalizing the number of filter elements each added signal interacts with. The number of interactions and approximate insertion losses for each of the WDM signals added by WADM 200 of FIG. 2 is shown in Table 2.

TABLE 1

| Character-<br>istic<br>Wavelength | TFFEs reflect-<br>ing or<br>transmitt-<br>ing signal | FBGs reflect-<br>ing or transmit-<br>ting signal | Total number<br>of affecting<br>elements | Approx-<br>imate<br>inser-<br>tion loss |
|---|---|---|---|---|
| $\lambda_1$ | (222, 224, 226, 228) | (232) | five | 5.6 dB |
| $\lambda_3$ | (224, 226, 228) | (232, 234, 232) | six | 5.3 dB |
| $\lambda_5$ | (226, 228) | (232, 234, 236, 234, 232) | seven | 5.0 dB |
| $\lambda_7$ | (228) | (232, 234, 236, 238, 236 234, 232) | eight | 4.7 dB |

By way of comparison, signals in through channels (i.e., neither dropped nor added to the signal stream) are transmitted, for example, through the four FBGs 238, 236, 234 and 232 as well as through two ports of circulator 230 to accumulate an insertion loss of approximately 2.0 dB.

It will be readily apparent to one skilled in the art that the embodiments of FIGS. 1 and 2 may be altered to include a greater or lesser number of FBGs and associated TFFEs. In addition, the WADM embodiments of FIGS. 1 and 2 may be used, for example, in combination to both add signals to and remove signals from the WDM network.

Figure 3:
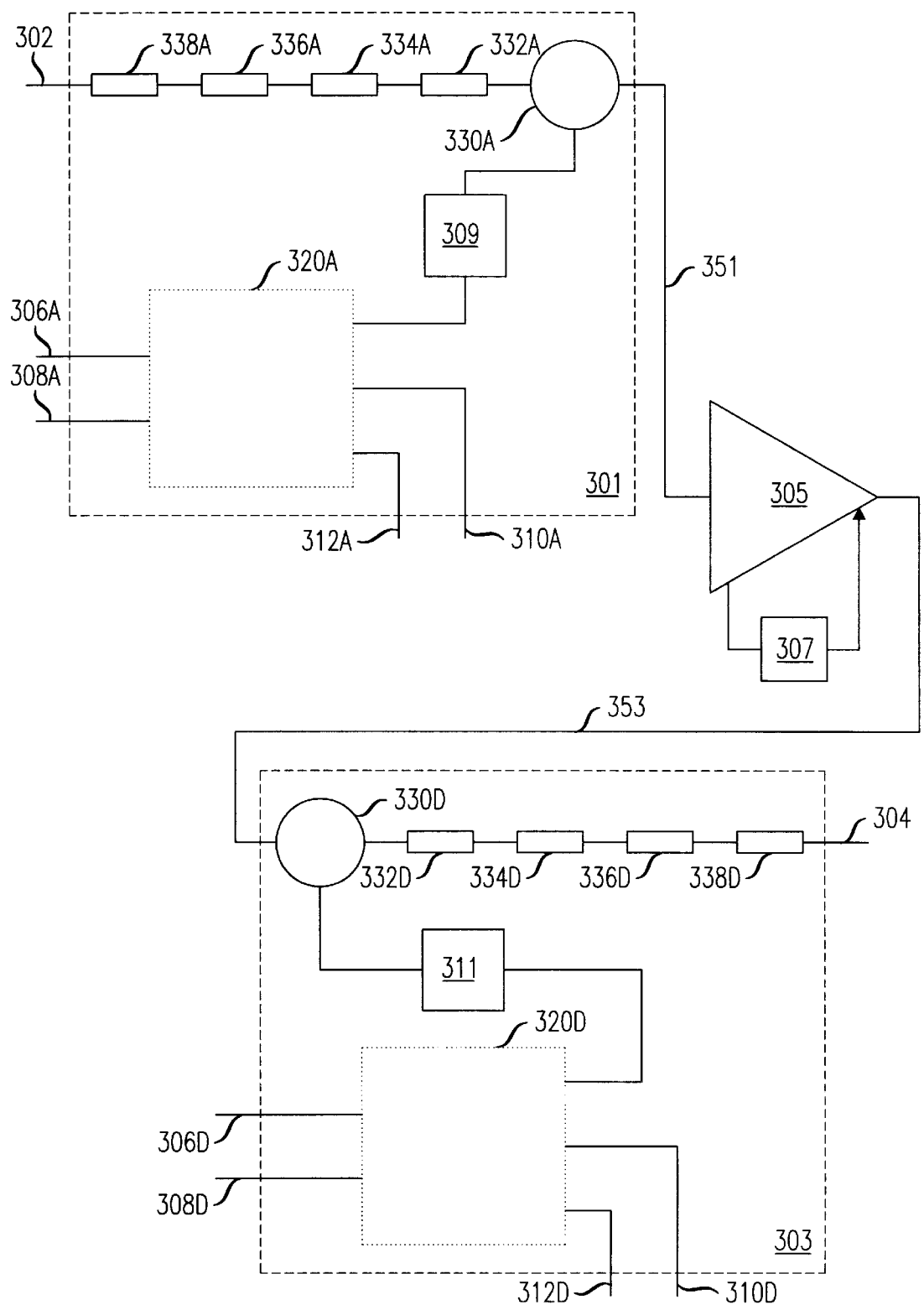
FIG. 3 shows WADM employing both the first and second embodiments of FIGS. 1 and 2.

FIG. 3 illustrates one possible arrangement of a combination WADM 300. Combination WADM 300 includes WADM 301 for adding WDM signals at inputs 306A, 308A, 310A and 312A, and WADM 303 for dropping WDM signals at outputs 306D, 308D, 310D, and 312D. WADM 300 also includes an optical amplifier (OA) 305 interposed between WADMs 301 and 303. Because WADMs generally interconnect fiber media spans of significant length (for example, tens of kilometers), WDM signals reaching and traveling beyond WADM 300 may require amplification prior to further processing. OA 305 is employed to amplify through signals received from a predecessor span that travel through WADM 300 on to a next optical fiber span, signals added by WADM 301 that travel on to the next span, and signals received from the predecessor span that are dropped by WADM 303.

In order to minimize the number of OAs required (and thereby decrease cost), a single OA 305 is interposed between WADM 301 and WADM 303. In this preferred configuration, through signals, added signals and dropped signals are each amplified by OA 305 at an appropriate point in their transit. However, because WDM signals are added at WADM 301 upstream from WADM 303 where WDM signals are dropped, WDM channels associated with the added signals must generally be distinct from channels associated with the dropped signals. Otherwise, channels added by WADM 301 will be immediately dropped by WADM 303.

In practice, this limitation may be overcome by adding an additional WADM SU 300 downstream from output 304. Since downstream WADM SU 300 adds WDM signals after upstream WADM 303 drops WDM signals, downstream WADM SU 300 may add signals in channels associated with signals dropped by upstream drop WADM 303.

Figure 4:
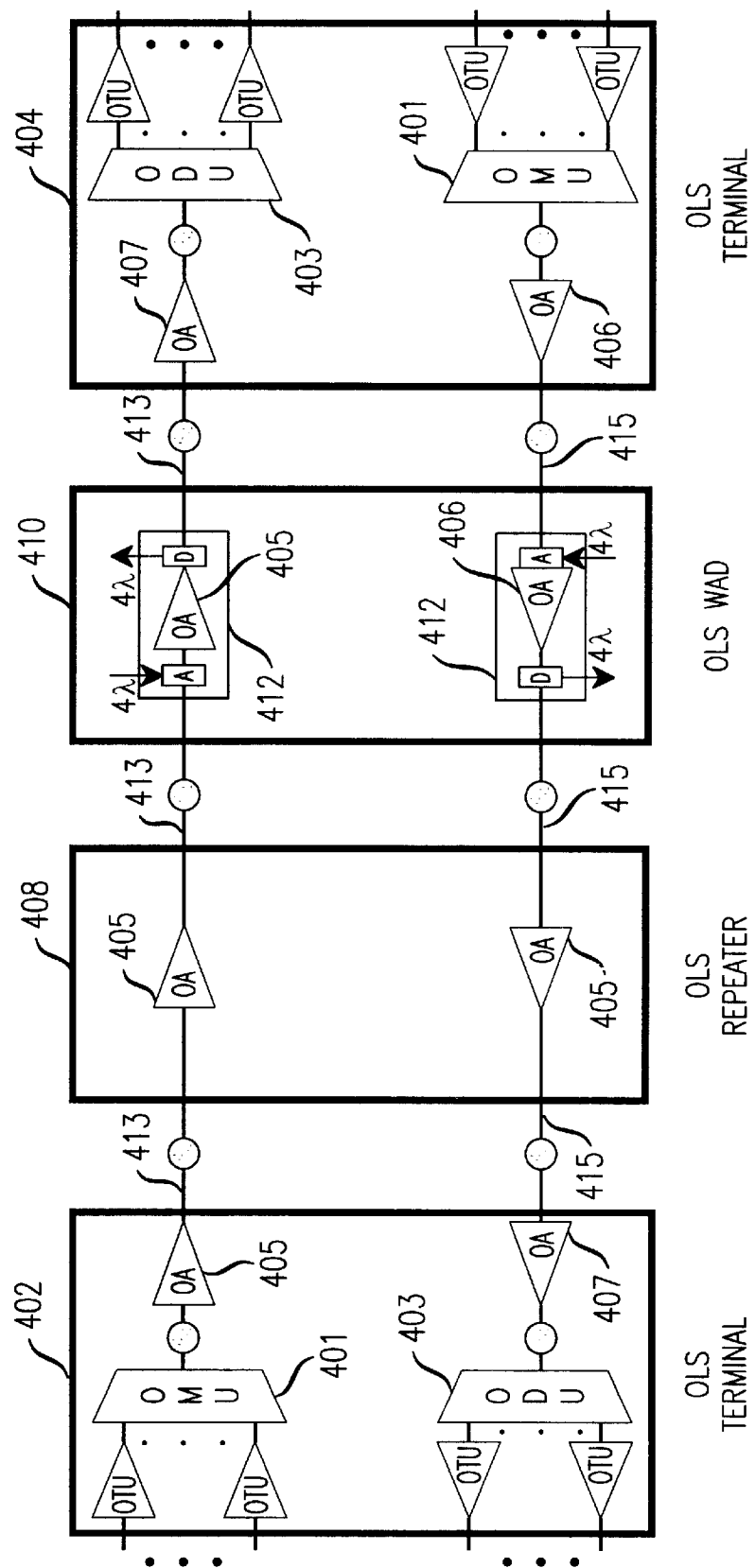
FIG. 4 illustrates how the WADM of FIG. 3 may be placed in a WDM network.

FIG. 4 illustrates a WDM network 400 that employs the WADM SU 300 of FIG. 3. WDM network 400 is delineated by WDM terminals 402 and 404. Optical signals are multiplexed by optical multiplexer 401 of terminal 402 to form a WDM signal that is transported over fiber optical links 413 to terminal 404. At terminal 404, optical demultiplexer 403 demultiplexes the WDM signal received over links 413 in order to reproduce the optical signals multiplexed at terminal 402. In addition, terminal 404 also includes an optical multiplexer 401 that multiplexes optical signals to form a WDM signal that is transported over optical links 415 to optical multiplexer 403 in terminal 402. In this manner, optical signals are sent in two directions over separate fiber optical links 413 and 415.

Optical terminal 402 also incorporates optical amplifiers 405 and 407 to amplify WDM signals sent by optical multiplexer 401 of terminal 402 and to amplify WDM signals received for optical de-multiplexer 403 of terminal 402. Optical amplifiers 405 and 407 of terminal 404 perform similar functions for optical multiplexer 401 of terminal 404 and optical de-multiplexer 403 of terminal 404, respectively.

Optical links 413 and 415 may each span tens of kilometers, over which significant signal losses will occur. As a result, one or more optical repeaters 408 are placed at prescribed span lengths (for example, of approximately 80 kilometers) along optical links 413 and 415 in order to regenerate WDM signals. Optical repeaters 408 include optical amplifiers 406, which operate in analogy to optical amplifiers 405 and 407 of terminals 402 and 404.

One or more WADM terminals 410 may also be placed along optical links 413 and 415 to selectively add and drop WDM signals from specified WDM channels. WADM terminals 410 include WADMs 412 for each of the optical fiber links 413 and 415. Even with optical signal regeneration at, for example, optical repeater 407, signal to noise degradation limits the absolute number of spans that may be used with WADM terminals 410. Experience suggests that WADM terminals 410 may be used in WDM networks 400 at OC192 data rates having six or fewer spans along links 413 and 415. For longer spans, additional hardware is required to convert optical signals to electronic signals which may be retimed and reconverted to optical form for further transmission.

Transmission of WDM signals over long distance optical fiber spans at high bit rates requires use of dispersion compensating techniques to mitigate the effects of signal dispersion inherent to optical fiber transmission. For example, for OC192 transmissions over network spans of at least 60 kilometers, signals should be treated to 95 percent span loss compensation (in other words, reducing signal dispersion arising in the transmitted signal by 95 percent). In the network 400, for example, 95 percent span loss dispersion compensation along optical link 413 is provided by introducing 35 percent pre-compensation at OA 406 in terminal 402, 95 percent compensation at OAs 405 in repeater 408 and in WADM terminal 412, and 60 percent post-compensation at OA 407 in terminal 404.

As illustrated in FIG. 3, OA 305 provides dispersion compensation by incorporating dispersion compensating fiber (DCF) 307 within its signal path. DCF 307 introduces negative signal dispersion to compensate for positive signal dispersion arising from transmission of the WDM signal over preceding and subsequent network spans. DCFs of the type employed in DCF 307 are well-known and commercially available, for example, from JDS Uniphase and Corning.

Because channels are added by WADM 301 only a short distance from OA 305 and channels are dropped by WADM 303 only a short distance from OA 305, OA 305 overcompensates for dispersion in the added channels and dropped channels. In order to reduce the effects of this overcompensation, single mode fiber 309 in WADM 301 is positioned between thin film filter 320A and circulator 330A to introduce additional positive dispersion in the signal paths for the added channels. Similarly, single mode fiber 311 in WADM 303 is positioned between thin film filter 320D and circulator 330D to introduce additional positive dispersion in the signal paths for the dropped channels. Alternatively or additionally, FBGs 332A, 334A, 336A and 338A in WADM 301 and FBGs 332D, 334D, 336D and 338D in WADM 303 may be designed to add positive dispersion to the added and dropped WDM signals, respectively.

For example, for OC192 signals traveling over single mode optical fiber, WADM 301 of FIG. 3 should incorporate a positive dispersion of approximately 650 picoseconds per nanometer and WADM 303 should incorporate a positive dispersion of approximately 450 picoseconds per nanometer. Of these amounts, approximately 250 picoseconds per nanometer of dispersion may be generated by the FBGs 132, 134, 136 and 138 of FIG. 1 and FBGs 232, 234, 236 and 238 of FIG. 2 directly. In order to reach desired dispersion levels, an additional 400 picoseconds per nanometer of positive dispersion may be added by single mode fiber 309 and an additional 200 picoseconds per nanometer of positive dispersion may be added by single mode fiber 311.

An objective of the present invention is to be capable of adding or dropping two or more WADM channels that may each carry optical signals transmitted at either a first data rate or a second data rate. Selected attributes of the FBGs and associated TFFEs employed in the present invention are key to achieving this objective.

For example, FIG. 5 illustrates a reflection and transmission profile for FBGs employed in the embodiments illustrated by FIGS. 1, 2 and 3. The FBG represented by FIG. 5 can be used, for example, to filter OC48 WDM signals transmitted at a rate of approximately 2.5 gigabits per second in channels spaced at 50 gigahertz intervals as well as OC192 WDM signals transmitted at a rate of approximately 10 gigabits per second in channels spaced at 100 gigahertz intervals. This embodiment may also be used to filter signals transmitted at lesser data rates (for example, OC-12 signals operating at 622 megabits per second and OC-3 signals operating at 155 megabits per second)

In FIG. 5, FBG reflection profiles 502 and 504 are shown for equivalent FBGs associated with add WADM 301 and drop WADM 303 of FIG. 3, respectively. The profiles portray the relative power of reflected signals as compared to input signal power at selected wavelengths within and near the reflection bandwidth. Similarly, FGB transmission profiles 506 and 508, associated with add WADM 301 and drop WADM 303, respectively, portray the relative power of transmitted signals as compared to input signal power at selected wavelengths.

The effective signal bandwidth for WDM signals transmitted or reflected by the FBG depicted by the profiles of FIG. 5 is demarcated by wavelengths at which the reflected or transmitted power drops by 10 dB with respect to the power of an associated input signal. Accordingly, the effective transmission bandwidth 512 in FIG. 5 is approximately 0.45 nanometers and the effective reflection bandwidth 514 is approximately 0.4 nanometers.

In order to function at both OC48 and OC192 signal rates, these effective bandwidths must be sufficiently narrow to avoid adjacent channel crosstalk from closely spaced channels at lower data rates (for example, OC48 channels that are nominally spaced at approximately 0.4 nanometers). In addition, the bandwidths must be wide enough to capture a sufficient portion of signals at higher data rates (for example, OC192 signal carried in channels that are nominally spaced at approximately 0.8 nanometers).

An appropriate FBG bandwidth can be selected by analyzing signal power penalties for both signal rates at various effective FBG bandwidths. The use of power penalties in the analysis of signal quality is well-known in the art (see, e.g., Harry J. R. Dutton, *Understanding Optical Communications*, Prentice-Hall, 1998, pp. 403, 404). Common measures of signal quality include signal to noise ration and inter-symbol interference.

Figure 7A:
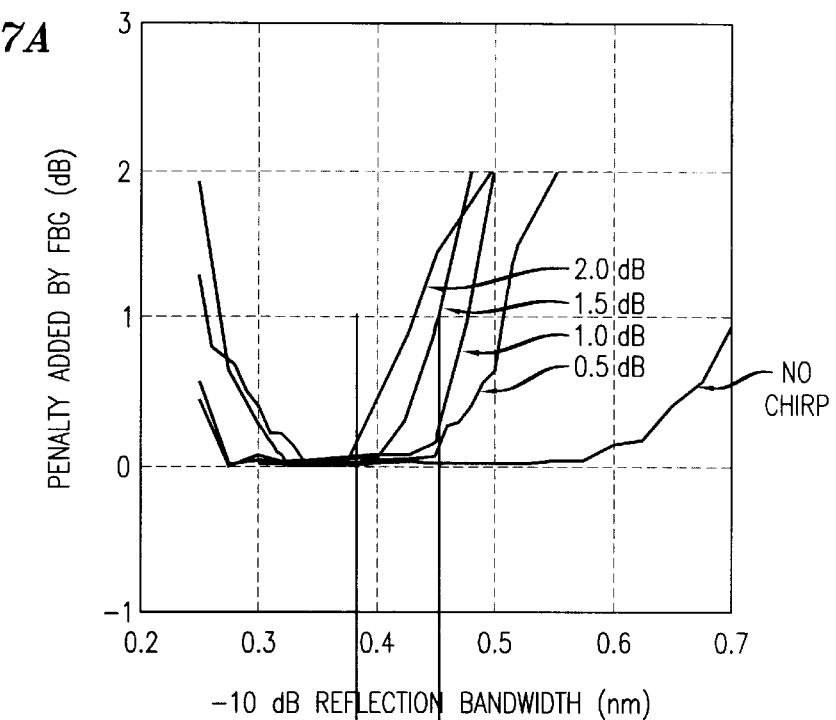
FIGS. 7A and 7B illustrate SPM/XPM penalties for an FBG used in the present invention at OC48 and OC192 data rates, respectively.
Figure 7B:
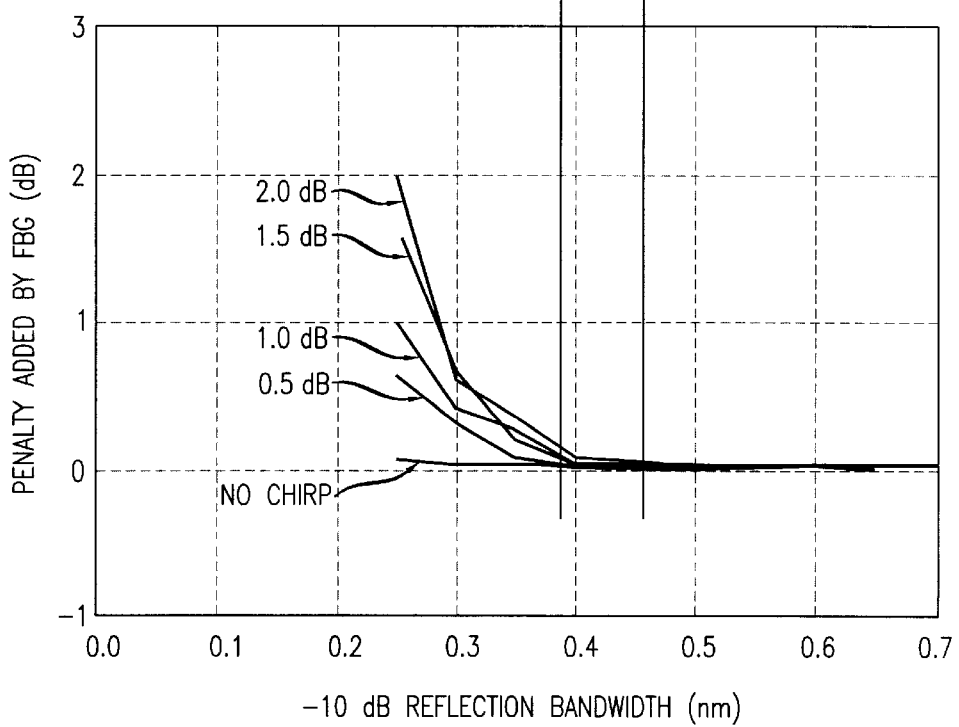

FIGS. 7A and 7B illustrate FBG power penalties for OC48 and OC192 signal rates, respectively, at various effective bandwidths. The power penalties are influenced by various transmission impairments present in the WDM signal as it is input to the FBG. These input signal impairments may be characterized by self phase modulation/cross phase modulation (SPM/XPM) penalty, a pre-FBG power penalty measure with respect to inter-symbol interference. SPM/XPM penalty is influenced, for example, by a variety of WDM system attributes including dispersion characteristics, system architecture, signal chirp and signal power. As illustrated in FIGS. 7A and 7B, FBG power penalty varies non-linearly with SPM/XPM penalty.

In FIGS. 7A and 7B, FBG power penalty is shown as a function of effective bandwidth and SPM/XPM penalty. The SPM/XPM penalty present in the input signal ranges from no penalty ("no chirp") to a penalty of 2.0 dB. Increasing FBG power penalties shown in FIG. 7A for OC48 signal rates reflect the effects of cross talk from neighboring channels at bandwidth upper boundaries and the effects of loss of signal spectrum at the lower boundaries. Similarly, increasing FBG penalties shown in FIG. 7B for OC192 signal rates reflect the effects of loss of signal spectrum at the lower boundaries.

Assuming a SPM/XPM penalty of 2.0 dB, an effective bandwidth 722 of approximately 0.38 nanometers appears to minimize the overall power penalty at both OC48 and OC192 signal rates. Since OC192 signals tend to accumulate higher SPM/XPM penalties in a given WDM network than OC48 signals and FBGs may experience significant drift and jitter, our experience suggests that a somewhat larger effective bandwidth 724 of about 0.45 nanometers (approximately 54 gigahertz) provides better overall performance.

For OC192 signal rates, signal dispersion becomes a critical issue. As illustrated in FIG. 3 and as previously discussed, dispersion for signals introduced at add WADM 301 and for signals dropped at drop WADM 303 may be nominally adjusted by a variety of means. However, treating nominal conditions alone is insufficient, as FBGs typically exhibit a strongly varying dispersion over their reflection bandwidth. Our experience shows, for example, that dispersion increases dramatically at edge wavelengths as SPM/XPM penalties increase.

Figure 9:
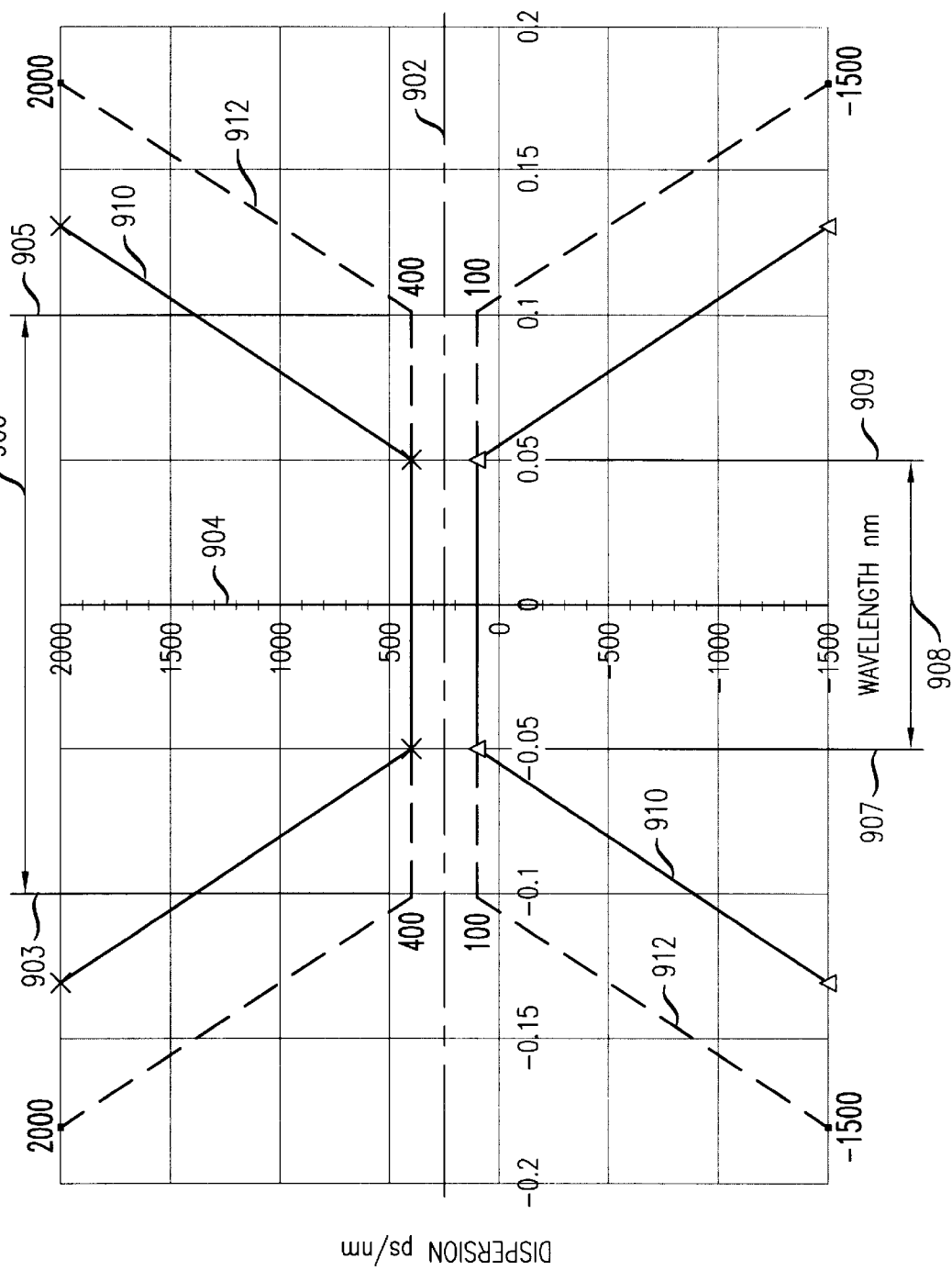
FIG. 9 shows limits for FBG dispersion levels as a function of wavelength.

The effects of these variations must be appropriately limited. FIG. 9 presents a dispersion template with appropriate limits to satisfy requirements for the present invention. For an OC192 signal reflected by an FBG with an effective bandwidth of about 0.45 nanometers, the template graphs allowable limits in dispersion deviation from the nominal value over that bandwidth such that FBG power penalty (including the associated SPM/XPM penalty) is no greater than 2.0 dB.

Allowable dispersion limits are shown by limits 910. Limits 910 define a region 908 applicable to reflected wavelengths within 0.05 nanometers of FBG characteristic wavelength 904. Within region, 908, dispersion may vary by no more than 150 picoseconds per nanometer from a nominal FBG dispersion value 902 (for example, 250 picoseconds per nanometer). For reflected wavelengths beyond region 908, the limit of 150 picoseconds per nanometer may increase from the edges 907 and 909 of region 908 at a rate no greater than 20,000 picoseconds per square nanometer.

FBG dispersion variation may in fact increase over time as a result of various FBG aging effects. In order to maintain performance within the boundaries of limits 910, guard band limits 912 may be established for newly-manufactured FBGs. In the example shown in FIG. 9, guard band limits 912 define a region 906 applicable to reflected wavelengths within 0.1 nanometers of center wavelength 904. Within region 906, dispersion may vary by no more than 150 picoseconds per nanometer from nominal dispersion value 902. For reflected wavelengths beyond region 906, the limit of 150 picoseconds per nanometer may increase from the edges 903 and 905 of region 906 at a rate no greater than 20,000 picoseconds per square nanometer. Various other guard band limits may be established according to actual experience with FBG aging effects.

Figure 10:
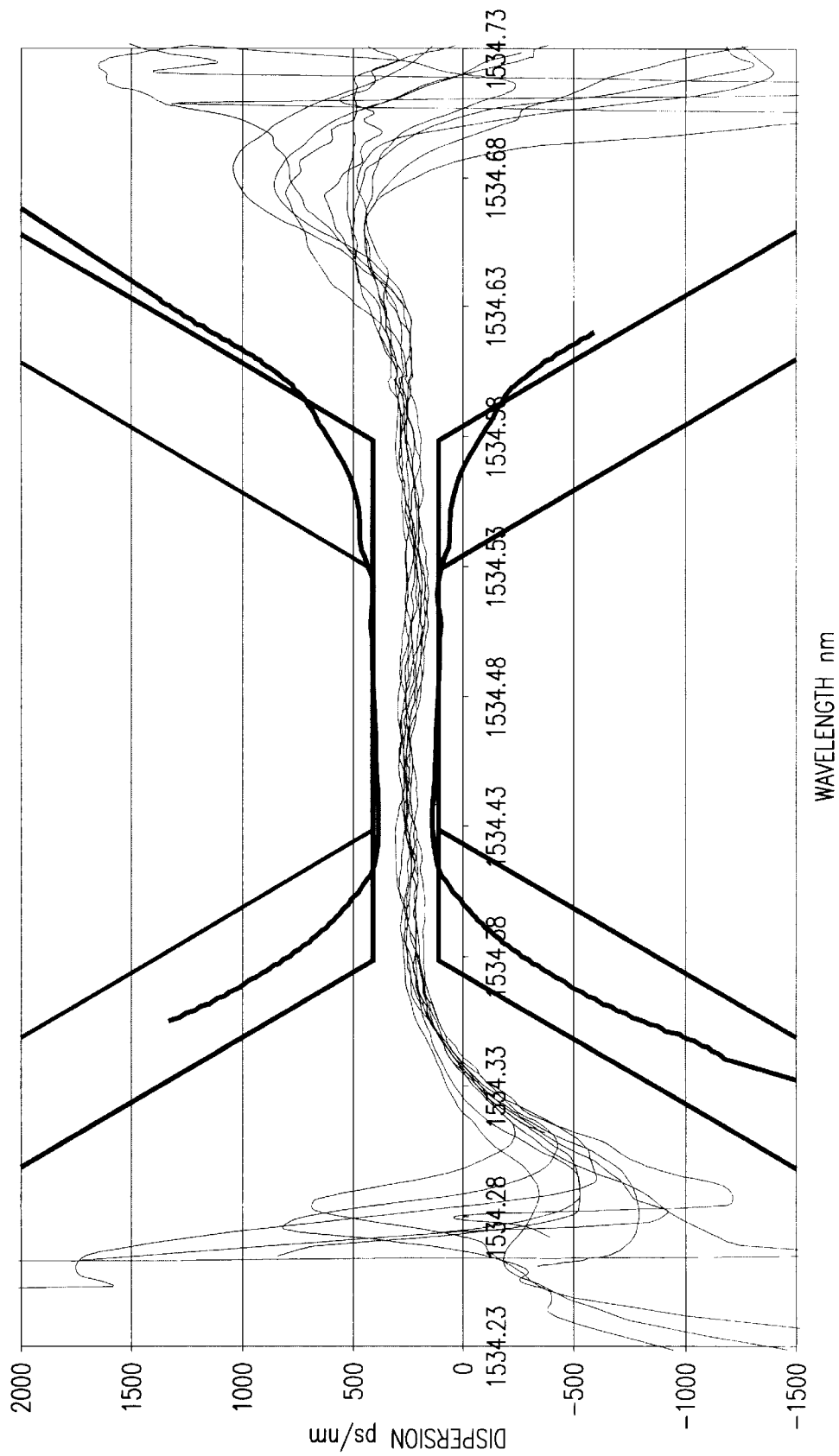
FIG. 10 shows dispersion levels for typical FBGs used in the embodiments of FIGS. 1–4.

FIG. 10 illustrates some sample dispersion profiles for FBGs that comply with the dispersion template of FIG. 9.

The exemplary embodiment described above is but one of a number of alternative embodiments of the invention that will be apparent to those skilled in the art in view of the foregoing description. Accordingly, this description is to be construed as illustrative only, and is for the purpose of teaching those skilled in the art the best mode of carrying out the invention. It is therefore to be understood that changes may be made in the particular embodiments of the invention which are within the scope and spirit of the invention as outlined by the appended claims.

We claim:

1. An optical wavelength add/drop multiplexer (WADM) comprising:
    an optical circulator;
    two or more fiber Bragg gratings (FBGs) serially interconnected and optically coupled to the circulator; and
    a thin-film filter optically coupled to the circulator, wherein the thin film filter includes two or more serially interconnected thin film filter elements (TFFEs).

2. The WADM of claim 1, wherein the two or more FBGs are each characterized by an effective bandwidth that minimizes signal degradation through the FBG when operating at two or more data rates.

3. The WADM of claim 2, wherein the two or more FBGs are each further characterized by a dispersion profile selected to maintain signal degradation through the FBG below a predetermined level for operation at a highest one of the two or more data rates.

4. The WADM of claim 2 or claim 3, wherein the signal degradation is determined as a power penalty.

5. The WADM of claim 4, wherein:
    four FBGs are serially interconnected to the circulator; and
    four thin film filter elements are included within the thin film filter and serially interconnected to the circulator.

6. The thin film filter elements of claim 1, further characterized by:
    an effective bandwidth selected to minimize signal degradation through the filter element for operation at each of the two or more data rates; and
    a dispersion profile across the effective bandwidth selected to maintain signal degradation through the filter element below a predetermined value for operation at a highest one of the two or more data rates.

7. The thin film filter elements of claim 6, wherein the signal degradation is determined as a power penalty.

8. The thin film filter elements of claim 7, wherein the effective bandwidth is selected to be approximately 0.45 nanometers at a power level varying by no more than 10 decibels from the power level at the characteristic wavelength.

9. The thin film filter elements of claim 6, wherein the thin film filter elements are FBGs.

10. The thin film filter elements of claim 9, wherein the FBGs have dispersion values that deviate by approximately 150 picoseconds per nanometer from a predetermined reference value at wavelengths no more than 0.1 nanometers above and below the characteristic wavelength, the deviation increasing at a rate no greater than approximately 20,000 picoseconds per square nanometer at wavelengths more than 0.1 nanometers from the characteristic wavelength.

11. The thin film filter elements of claim 6, wherein the highest of the two or more data rates is approximately 10 gigabits per second and others of the two or more data rates are less than or equal to 2.5 gigabits per second.

12. An optical wavelength add/drop multiplexer (WADM) for dropping two or more optical channels in a multi-wavelength optical signal, each of the two or more optical channels having an effective bandwidth approximately centered at a characteristic wavelength, the WADM comprising:

an optical circulator for receiving and distributing the multi-wavelength optical signal;

two or more fiber Bragg gratings (FBGs), wherein the two or more FBGs are serially interconnected and coupled to the circulator to receive the multi-wavelength optical signal, each of the two or more FBGs being operative to select one of the optical channels in the multi-wavelength optical signal and to reflect the selected optical channel back to the circulator, each optical channel operating at either a first data rate or a second data rate; and a demultiplexer coupled to the circulator to receive an optical signal reflected by the FBGs and drop two or more optical channels from the reflected signal, wherein the demultiplexer is a thin film filter including two or more serially interconnected thin film filter elements (TFFEs).

13. The WADM of claim 12, wherein each the two or more optical channels are associated in a defined order with one of the two or more FBGs, the association being made in order of increasing optical distance from the optical circulator for the two or more FBGs.

14. The WADM of claim 13, wherein each of the two or more optical channels is further associated in the defined order with one of the two or more thin film filter elements, the association being made in order of decreasing optical distance from the optical circulator for the two or more thin film filter elements.

15. The WADM of claim 12, wherein an effective bandwidth for each of the two or more FBG's is selected to minimize signal degradation through the FBG for operation at both the first data rate and operation at the second data rate.

16. The WADM of claim 15, wherein the signal degradation is determined as a power penalty.

17. The WADM of claim 15, wherein the bandwidth of each of the two or more FBGs is selected to be approximately 0.45 nanometers at a power level varying by no more than 10 decibels from the power level at the characteristic wavelength.

18. The WADM of claim 15, wherein a dispersion profile over the selected bandwidth for each of the two or more FBGs is further selected to maintain signal degradation through each FBG below a predetermined level during operation at a highest one of the two or more data rates.

19. The WADM of claim 18, wherein the signal degradation is determined as a power penalty.

20. The WADM of claim 18, wherein:

the bandwidth of each of the two or more FBGs is selected to be approximately 0.45 nanometers at a power level varying by no more than 10 decibels from the power level at the characteristic wavelength; and the dispersion profile for each of the two or more FBGs is defined by dispersion values that deviate by approximately 150 picoseconds per nanometer from a predetermined reference value at wavelengths no more than 0.1 nanometers above and below the characteristic wavelength, the deviation increasing at a rate no greater than approximately 20,000 picoseconds per square nanometer at wavelengths more than 0.1 nanometers from the characteristic wavelength.

21. The WADM of claim 12, wherein the first data rate is selected to be 2.5 gigabits per second or less, and the second data rate is selected to be 10 gigabits per second.

22. The WADM of claim 21, wherein channels operating at the first data rate are spaced at approximately 50 gigahertz intervals and channels operating at the second data rate are spaced at approximately 100 gigahertz intervals.

23. The WADM of claim 21, wherein spacing between characteristic wavelengths associated with successive ones of the two or more channels to be filtered is selected to be approximately 200 gigahertz.

24. The thin film filter elements of claim 12, further characterized by:

an effective bandwidth selected to minimize signal degradation through the filter element for operation at each of the two or more data rates; and a dispersion profile across the effective bandwidth selected to maintain signal degradation through the filter element below a predetermined value for operation at a highest one of the two or more data rates.

25. An optical wavelength add/drop multiplexer (WADM) for adding two or more optical channels in a multi-wavelength optical signal, each of the two or more optical channels having an effective bandwidth approximately centered at a characteristic wavelength, the WADM comprising:

an optical circulator for receiving and distributing the multi-wavelength optical signal;

a multiplexer operative to receive one of the two or more added channels, to combine the two or more added channels and to distribute said combined added optical channels to the optical circulator, wherein the multiplexer is a thin film filter including two or more serially interconnected thin film filter elements (TFFEs); and two or more fiber Bragg gratings (FBGs), wherein the two or more FBGs are serially interconnected and coupled to the circulator to receive the multi-wavelength optical signal in combination with the added optical channels, each of the two or more FBGs being operative to select one of the optical channels in the multi-wavelength optical signal and to reflect the selected optical channel back to the circulator, each optical channel operating at either a first data rate or a second data rate.

26. The WADM of claim 25, wherein each the two or more optical channels are associated in a defined order with one of the two or more FBGs, the association being made in order of increasing optical distance from the optical circulator for the two or more FBGs.

27. The WADM of claim 26, wherein each of the two or more optical channels is further associated in the defined order with one of the two or more thin film filter elements, the association being made in order of decreasing optical distance from the optical circulator for the two or more thin film filter elements.

28. The WADM of claim 25, wherein an effective bandwidth for each of the two or more FBG's is selected to minimize signal degradation through the FBG for operation at both the first data rate and operation at the second data rate.

29. The WADM of claim 28, wherein the signal degradation is determined as a power penalty.

30. The WADM of claim 28, wherein the bandwidth of each of the two or more FBGs is selected to be approximately 0.45 nanometers at a power level varying by no more than 10 decibels from the power level at the characteristic wavelength.

31. The WADM of claim 28, wherein a dispersion profile over the selected bandwidth for each of the two or more FBGs is selected to maintain signal degradation through each FBG below a predetermined level during operation at a highest one of the two or more data rates.

32. The WADM of claim 31, wherein the signal degradation is determined as a power penalty.

33. The WADM of claim 31, wherein:
the bandwidth of each of the two or more FBGs is selected to be approximately 0.45 nanometers at a power level varying by no more than 10 decibels from the power level at the characteristic wavelength; and,
the dispersion profile is defined by dispersion values that deviate by approximately 150 picoseconds per nanometer from a predetermined reference value at wavelengths no more than 0.1 nanometers above and below the characteristic wavelength, the deviation increasing at a rate no greater than approximately 20,000 picoseconds per square nanometer at wavelengths more than 0.1 nanometers from the characteristic wavelength.

34. The WADM of claim 25, wherein the first data rate is selected to be 2.5 gigabits per second or less, and the second data rate is selected to be 10 gigabits per second.

35. The WADM of claim 34, wherein channels operating at the first data rate are spaced at approximately 50 gigahertz intervals and channels operating at the second data rate are spaced at approximately 100 gigahertz intervals.

36. The WADM of claim 34, wherein spacing between characteristic wavelengths associated with successive ones of the two or more channels to be filtered is selected to be approximately 200 gigahertz.

37. The WADM of claim 25, wherein:
four FBGs are serially interconnected to the circulator; and
four thin film filter elements are included within the thin film filter and serially interconnected to the circulator.

38. The thin film filter elements of claim 25, further characterized by:
an effective bandwidth selected to minimize signal degradation through the filter elements for operation at each of the two or more data rates; and
a dispersion profile across the effective bandwidth selected to maintain signal degradation through the filter elements below a predetermined value for operation at a highest one of the two or more data rates.

* * * * *